United States Patent [19]
Takagishi et al.

[11] Patent Number: 5,982,737
[45] Date of Patent: Nov. 9, 1999

[54] OPTICAL DISK HAVING FIRST DESIGN VISIBLE FROM ONE SIDE OF THE DISK AND A SECOND DESIGN VISIBLE FROM THE OTHER SIDE OF THE DISK

[75] Inventors: Ryoju Takagishi, Tokyo; Ryouhei Yoshihara, Shizuoka, both of Japan

[73] Assignee: Toshiba-Emi Limited, Tokyo, Japan

[21] Appl. No.: 08/903,001

[22] Filed: Jul. 30, 1997

[30] Foreign Application Priority Data

Jun. 30, 1997 [JP] Japan .................................... 9-174393

[51] Int. Cl.⁶ ................................................ G11B 7/24
[52] U.S. Cl. .................................... 369/275.1; 369/275.3
[58] Field of Search ........................... 369/275.1, 275.3, 369/275.5, 283, 103, 286, 288, 274, 275.2, 275.4, 14, 277, 278, 279, 112, 13; 283/113; 156/245

[56] References Cited

U.S. PATENT DOCUMENTS

| | | | |
|---|---|---|---|
| 5,509,991 | 4/1996 | Choi ........................................ | 156/245 |
| 5,608,718 | 3/1997 | Schiewe .................................. | 369/275.4 |
| 5,675,570 | 10/1997 | Ohira et al. ............................ | 369/275.1 |
| 5,751,671 | 5/1998 | Koike et al. ............................ | 369/14 |
| 5,751,690 | 5/1998 | Ohira et al. ............................ | 369/275.3 |

FOREIGN PATENT DOCUMENTS

| | | |
|---|---|---|
| 6-508712 | 9/1994 | Japan . |
| 9410684 | 5/1994 | WIPO . |

*Primary Examiner*—Ali Neyzari
*Attorney, Agent, or Firm*—McDermott, Will & Emery

[57] ABSTRACT

In an optical disk, a display area is formed between the circumference of a recorded area and the circumference of the maximum area to which a recorded area can be provided. A reflective layer is formed covering the recorded area 3 and covering the display area forming a transparent display area at least in part of the display area. And to the transparent display area, a print layer is provided. According to this composition, there is provided the transparent display area without the reflective layer in the optical disk with a recorded area of a small diameter. Therefore, discrimination of the size or diameter of a record area of 12 cm CDs is made easier, and the print layer provided to the transparent display area can be seen from both sides of the optical disk.

4 Claims, 2 Drawing Sheets

OPTICAL DISK HAVING FIRST DESIGN VISIBLE FROM ONE SIDE OF THE DISK AND A SECOND DESIGN VISIBLE FROM THE OTHER SIDE OF THE DISK

BACKGROUND OF THE INVENTION

1. Field of the Invention

The present invention relates to an optical disk for storing audio/video information or general data, and in particular, to an optical disk provided with a recorded area of a small diameter, in which the size of the display area for displaying letters, pictures, etc. on the disk is enlarged.

2. Description of the Prior Art

FIG. 4 is a schematic diagram showing the surface of a conventional optical disk such as a CD (compact disc) and a DVD (digital video disc) with a diameter of 12 cm. As shown in FIG. 1, the conventional optical disk comprises a center hole 12, a clamping area 13 outside the center hole 12, a lead-in area 14 outside the clamping area 13, a program area 15 outside the lead-in area 14, a lead-out area 16 outside the program area 15, and a narrow transparent area 17 between the lead-out area 16 and the circumference of the optical disk. In such conventional optical disks, even in the case where the diameter of the recorded area of a 12 cm optical disk fits in that of 8 cm optical disks, null data pits are formed on the 12 cm optical disk from a diameter corresponding to that of the recorded area of 8 cm optical disks to the maximum diameter to which recorded areas of 12 cm optical disks can be provided, and a reflective layer is also formed on the above area. Therefore, in conventional optical disks, discrimination of the diameter of the recorded area in appearance is difficult. In addition, the display area can be formed only on the one side of the disk.

As disclosed in JP-A-6-508712 (PCT), some types of optical disks are proposed in order to expand the display area of optical disks used for displaying letters, pictures, etc.

According to the optical disk disclosed in JP-A-6-508712 (PCT), in the case where the diameter of the recorded area of a 12 cm optical disk fits in that of 8 cm optical disks, audio information can be written in a recorded area from inside of the disk toward outside, for example, within a diameter of 70–80 mm, and a metallization area outside the recorded area within a diameter of 118 mm serves as the display area to which holograms or pictures are freely provided.

However, the holograms can be made on only the one side so that in the case where metallization process is utilized for displaying letters, pictures, etc. on optical disks, a plate for the holograms must be produced for every CD title and thus there exist problems of operation efficiency, cost, etc.

Moreover, when label design (display of contents, tune titles, trademarks, etc.) is displayed on a conventional optical disk, display of only one type of label design on one side of the optical disk is possible and display of different types of label designs on both sides of the disk is impossible.

SUMMARY OF THE INVENTION

It is therefore the primary object of the present invention to provide an optical disk with a recorded area of a small diameter which can easily discriminate the size or diameter of the recorded area in a 12 cm optical disk.

Another object of the present invention is to provide an optical disk with above-mentioned advantage at a low cost and efficiently.

Another object of the present invention is to provide an optical disk with a recorded area of a small diameter which can be provided with display areas on both sides of the disk.

Still another object of the present invention is to provide an optical disk with a recorded area of a small diameter which is capable of displaying different types of label designs on both sides of the disk.

In order to attain the above objects, there is provided an optical disk comprising a recorded area for storing information formed in the shape of a ring, a reflective layer covering the recorded area, a display area formed between the circumference of the recorded area and the circumference of the maximum area to which a recorded area can be provided, said reflective layer covering the display area forming a transparent display area at least in part of the display area, and a print layer provided to the transparent display area. According to this composition, there is provided the transparent display area without the reflective layer in the optical disk with a recorded area of a small diameter. Therefore, the size or diameter of the recorded area can be easily discriminated, and the print layer provided to the transparent display area can be seen from both sides of the optical disk.

Preferably, the print layer includes a first design layer formed on the transparent display area, a background layer formed on the first design layer, and a second design layer formed on the background layer. According to this composition, there are provided the first design layer and the second design layer sandwiching the background layer therebetween on the transparent display area. Therefore, different label designs can be displayed on the right side and the reverse side of the optical disk.

Preferably, the circumference of the reflective layer is circumscribed about the lead-out of the recorded area. According to this composition, the size of the reflective layer can be minimized and thus the display area of enough size can be obtained. In this case, the outer diameter of the lead-out may be within a range from 51 mm to 117 mm (e.g. 60 mm, 70 mm, 90 mm, 100 mm, 110 mm, etc.)

Preferably, the circumference of the recorded area is formed at the same position as the circumference of the recorded area of 8 cm CDs. According to this composition, in the case where the diameter of optical disk is 12 cm, discrimination of the size or diameter of the recorded are of the 12 cm optical disk is made pretty easier by appearance of the size of the reflective layer.

Preferably, the reflective layer is formed with an outward form of the shape of a circle and with the same diameter as the reflective layer of 8 cm CDs. According to this composition, discrimination of the size or diameter of the recorded area is made pretty easier by appearance of the size of the reflective layer.

Preferably, the outward form of the reflective layer is formed in other shape than a circle such as a polygon, an outward form of an animal or a plant, etc. According to this composition, degree of freedom of display can be raised.

BRIEF DESCRIPTION OF THE DRAWINGS

The above and other objects and features of the present invention will be more apparent from the following description taken in conjunction with the accompanying drawings, in which.

DESCRIPTION OF THE PREFERRED EMBODIMENTS

Figure 1:
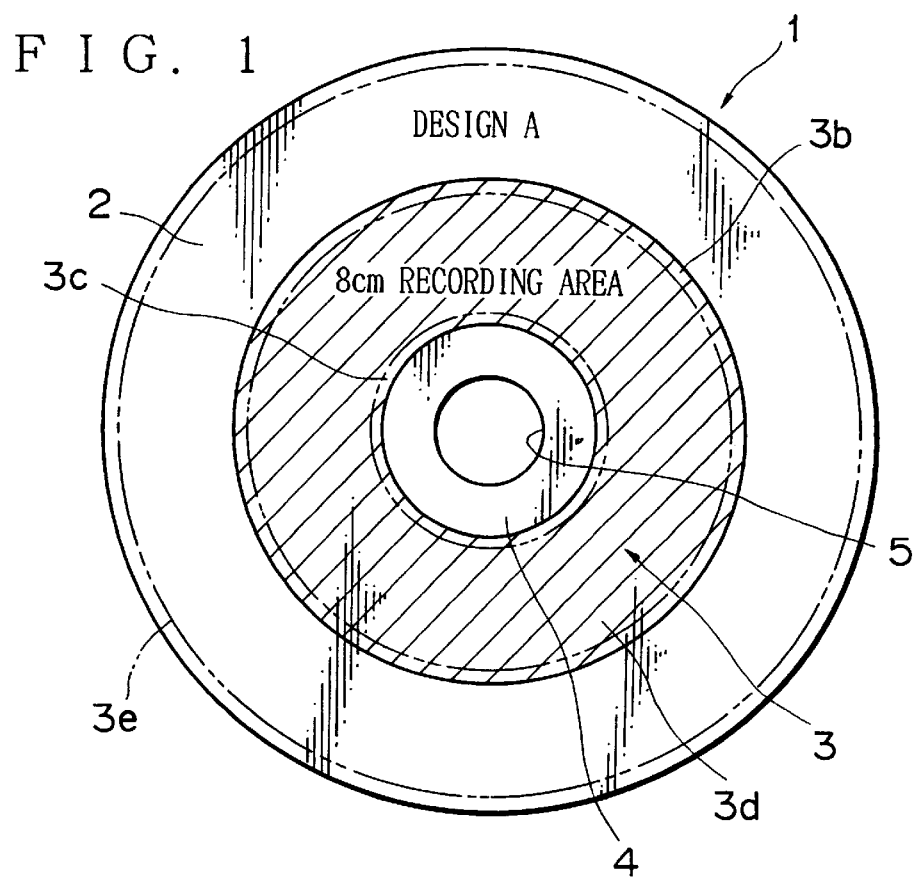
FIG. 1 is a schematic diagram showing the surface (light incidence side) of an optical disk provided with a recorded area of a small diameter according to an embodiment of the present invention.

Referring now to the drawings, a description will be given in detail of preferred embodiments of the present invention.

Figure 2:
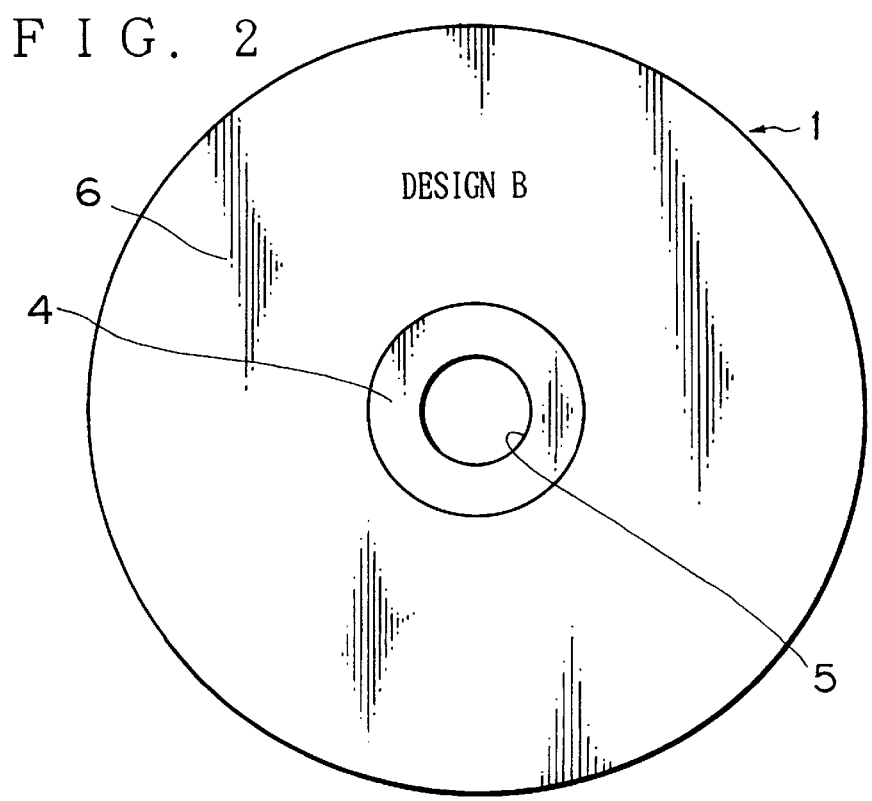
FIG. 2 is a schematic diagram showing the opposite surface (protective layer side) of the optical disk of FIG. 2.

FIG. 1 shows the surface (incidence side) of an optical disk provided with a recorded area of a small diameter according to an embodiment of the present invention. FIG. 2 shows the opposite surface (protective layer side) of the optical disk of FIG. 3. And FIG. 3 is showing a printing step in production of an optical disk according to an embodiment of the present invention.

Figure 3:
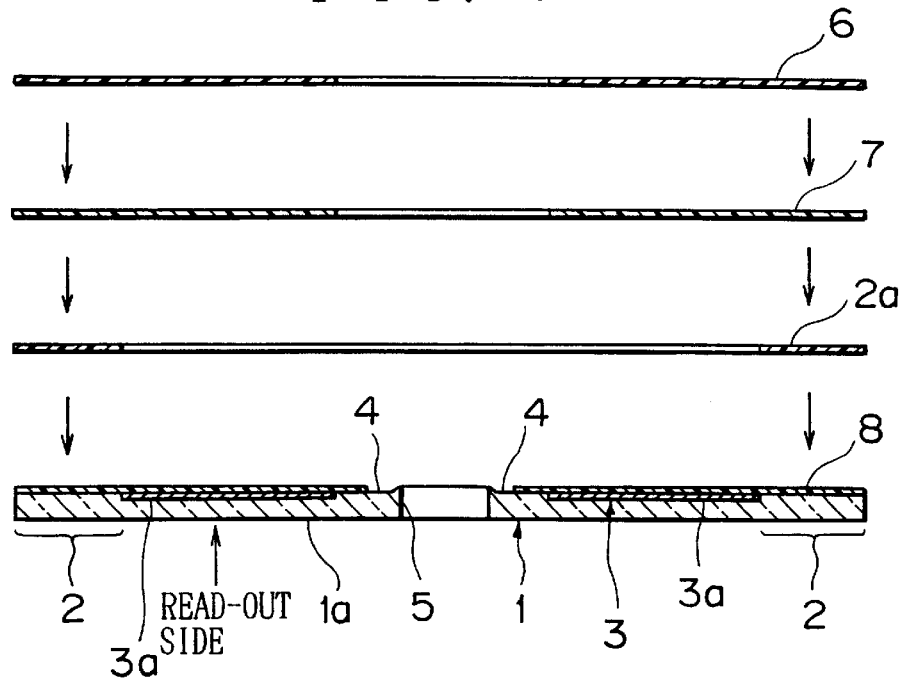
FIG. 3 is a schematic sectional diagram showing a printing step in production of an optical disk according to an embodiment of the present invention.
Figure 4:
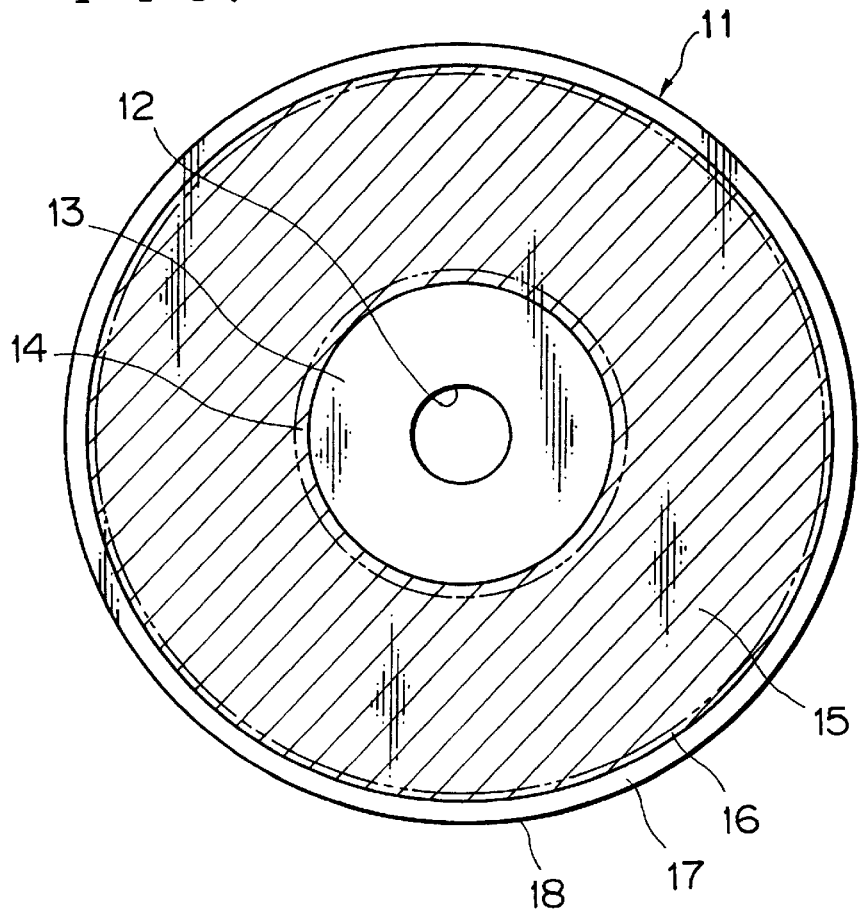
FIG. 4 is a schematic diagram showing the surface (light incidence side) of a conventional optical disk.

As shown in FIGS. 2 to 4, the optical disk 1 with a recorded area of a small diameter according to an embodiment of the present invention comprises a transparent base disk 1a for a 12 cm CD, a recorded area 3 of the shape of a ring or annulus, and a reflective layer 3a of the shape of a ring. The recorded area 3 and the reflective layer 3a are formed on the transparent base disk 1a in the same areas of those of 8 cm CD. In other words, the diameter of the transparent base disk 1a is 120 mm which is the same as that of 12 cm CD, and the recorded area 3 consists of a lead-out area 3b formed within a diameter of 76 mm as a lead-out area of 8 cm CD, a program area 3d formed in diameter range of 50 mm to 75 mm as a program area of 8 cm CD, and a lead-in area 3c formed in diameter range of 46 mm to 50 mm as a lead-in area of 8 cm CD.

Therefore in the optical disk 1, the diameter of the recorded area 3 is ⅔ of the maximum diameter 3e within which formation of a recorded area is possible. Incidentally, a clamping area 4 is formed in a ring shape area in diameter range of 26 mm to 33 mm, and a center hole 5 is formed with a diameter of 15 mm.

On the recorded area 3, the reflective layer 3a of aluminum is formed and is covering the recorded area 3. The reflective layer 3a is formed with the same diameter or a little larger diameter than the diameter of the recorded area 3. Thus, a right side (incidence side) display area 2 is provided on the surface i.e. incidence side of the optical disk 1. The right side display area 2 is capable of displaying a label design A in an area between the circumference of the reflective layer 3a and the circumference of the optical disk 1. In this embodiment, the entire right side display area 2 is formed transparent, that is, the reflective layer 3a is not provided to the right side of the display area 2.

On the reflective layer 3a, a transparent protective layer 8 is applied on the entire opposite surface of the disk 1 as shown in FIG. 4. On the opposite surface, i.e. on the side of the protective layer 8, a reverse side (protective layer side) display area 6 which is capable of displaying a label design B in the same way as general 12 cm CDs is provided. Generally, as the label design B, label information such as the title of the disk, the catalogue number of the disk, etc. is displayed.

As shown in FIG. 3, a first print layer 2a is formed on the protective layer 8. The first print layer 2a serves as the first design layer for displaying the aforementioned design A corresponding to the right side display area 2. On the first print layer 2a, a background print layer 7 (a white layer in this embodiment) is formed. And on the background print layer 7, a second print layer 6a is formed. The second print layer 6a serves as the second design layer for displaying the aforementioned design B corresponding to the reverse side display area 6. Formation of the print layers 2a, 7 and 6a can be executed, for example, by means of screen printing, offset printing, PAD printing, etc.

According to the optical disk 1 of this embodiment, a label design B can be displayed on the reverse side of the disk in the same way as conventional optical disks, along with displaying a label design A different from the label design B on the right side (light incidence side) of the disk. By displaying different label designs on both sides of the disk (not one label design only on reverse side of the disk), visual information can be displayed on a wider area than conventional optical disks, and more visual value can be added to the disk. Moreover, discrimination from general optical disk, in which a recorded area is formed from inside of the disk and almost to the circumference of the disk, is easily done by appearance. Moreover, the recorded area 3 in this embodiment is formed in the same size as those of 8 cm CDs and thus the optical disk 1 can be produced easily utilizing conventional facilities.

Incidentally, although three print layers were provided in the above embodiment, more than three print layers may be provided by providing more than one colors on one side or both sides of the background print layer 7 so as to provide multicolored printing. Moreover, letters with line symmetry such as 0, 1, 8, A, H, I, M, O, T. U, V, W, X, Y, etc. can be printed in one print layer so that one label design can be seen from both sides of the optical disk.

Moreover, although the circumference of the reflective layer 3a was formed in the shape of a circle in the above embodiment, the shape of the circumference of the reflective layer can be formed in the other kind of shapes such as a polygon, an outward form of an animal or a plant, an outward form of a popular comic character, etc. so that degree of freedom of display can be raised.

In the above embodiment, the reflective layer 3a is covering approximately the same area as the recorded area 3 which is formed in a small diameter. Therefore, the range of the recorded area 3 which must be handled with care can be easily recognized by appearance, and thus the optical disk can be handled by the users easily and safely.

Generally, if dust, dirt, fingerprints, etc. stick to the incident side of a CD, reading error tends to occur and playback of recorded information may become impossible. Scratches on the recorded area 3 may also cause reading errors and may make playback of recorded information impossible. For preventing such troubles, instructions are printed on many of explanatories attached to CDs. However, according to the above embodiment, the reflective layer covers approximately the same area as the recorded area of a small diameter and thus the range of the recorded area to be handled with care can be easily recognized by appearance, and the users can easily hold the optical disk at the part outside the recorded area. Therefore, the users can handle the optical disk easily with remarkably reduced possibility of causing reading errors.

Incidentally, Braille can be formed in the part outside the recorded area. In this case, the size of Braille can be made larger and thus easy reading of Braille on optical disks is made possible. Formation of Braille on the disk is executed by forming convexities or concavities by etching etc. in the formation process of the disk.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical disc comprising:
   a recorded area for storing information formed in the shape of a ring;
   a reflective layer covering the recorded area;
   a transparent display area formed between a circumference of the recorded area and a circumference of the maximum area on which a recorded area can be provided, said transparent display area being essentially uncovered by said reflective layer;
   a print layer provided on said transparent display area,
   wherein the print layer includes:
      a first design layer formed on said transparent display area;
      a background layer formed on the first design area;
      a second design layer formed on the background layer; and
      wherein the circumference of the reflective layer is substantially circumscribed about a lead-out of the recorded area.

2. An optical disk comprising:
   a recorded area for storing information formed in the shape of a ring;
   a reflective layer covering the recorded area;
   a transparent display area formed between a circumference of the recorded area and a circumference of the maximum area on which a recorded area can be provided, said transparent display area being essentially uncovered by said reflective layer;
   a print layer provided on said transparent display area,
   wherein the print layer includes:
      a first design layer formed on said transparent display area;
      a background layer formed on the first design area;
      a second design layer formed on the background layer; and
      wherein the circumference of the recorded area is formed at the same position as the circumference of the recorded area of about 8 cm CDs.

3. An optical disk comprising:
   a recorded area for storing information formed in the shape of a ring;
   a reflective layer covering the recorded area;
   a transparent display area formed between a circumference of the recorded area and a circumference of the maximum area on which a recorded area can be provided, said transparent display area being essentially uncovered by said reflective layer;
   a print layer provided on said transparent display area,
   wherein the print layer includes:
      a first design layer formed on said transparent display area;
      a background layer formed on the first design area;
      a second design layer formed on the background layer; and
      wherein the reflective layer is formed with an outward form of the shape of a circle and with the same diameter as the reflective layer of about 8 cm CDs.

4. An optical disk comprising:
   a recorded area for storing information formed in the shape of a ring;
   a reflective layer covering the recorded area;
   a transparent display area formed between a circumference of the recorded area and a circumference of the maximum area on which a recorded area can be provided, said transparent display area being essentially uncovered by said reflective layer;
   a print layer provided on said transparent display area,
   wherein the print layer includes:
      a first design layer formed on said transparent display area;
      a background layer formed on the first design area:
      a second design layer formed on the background layer; and
      wherein an outward form of the reflective layer is formed in a shape other than a circle.

\* \* \* \* \*